United States Patent
Scholte-Wassink

(10) Patent No.: US 8,188,610 B2
(45) Date of Patent: May 29, 2012

(54) WIND TURBINE HAVING A MAIN POWER CONVERTER AND AN AUXILIARY POWER CONVERTER AND A METHOD FOR THE CONTROL THEREOF

(75) Inventor: Hartmut Scholte-Wassink, Lage (DE)

(73) Assignee: General Electric Company, Schenectady, NY (US)

( * ) Notice: Subject to any disclaimer, the term of this patent is extended or adjusted under 35 U.S.C. 154(b) by 579 days.

(21) Appl. No.: 12/206,073

(22) Filed: Sep. 8, 2008

(65) Prior Publication Data
US 2010/0060000 A1   Mar. 11, 2010

(51) Int. Cl.
*F03D 9/00*   (2006.01)
(52) U.S. Cl. .............................. 290/44; 290/43; 290/55
(58) Field of Classification Search ................... 290/44, 290/43, 55
See application file for complete search history.

(56) References Cited

U.S. PATENT DOCUMENTS

| | | | | |
|---|---|---|---|---|
| 7,038,330 B2 * | 5/2006 | Rosebrock et al. | ............. | 290/44 |
| 7,071,579 B2 * | 7/2006 | Erdman et al. | ................... | 290/55 |
| 7,205,676 B2 * | 4/2007 | Ichinose et al. | ................ | 290/44 |
| 7,253,537 B2 * | 8/2007 | Weng et al. | ..................... | 290/44 |
| 7,579,702 B2 * | 8/2009 | Park et al. | ........................ | 290/44 |

FOREIGN PATENT DOCUMENTS

WO   WO2005/113964 A1   12/2005

* cited by examiner

*Primary Examiner* — Tulsidas C Patel
*Assistant Examiner* — Iraj A Mohandesi
(74) *Attorney, Agent, or Firm* — Global Patent Operations; Douglas D. Zhang

(57) ABSTRACT

A wind turbine comprising a main generator, a main power converter connected to the main generator and adapted to convert the electrical output power of the main generator to an electrical power to be fed into the utility grid up to a first rated converter output power and an auxiliary power converter connected to the main generator and adapted to convert the electrical output power of the main generator to an electrical power up to a second rated converter output power which is lower than the first rated converter output power is provided. Further, a control architecture for controlling the power balance of a wind turbine and a method for operating a wind turbine are provided.

16 Claims, 7 Drawing Sheets

WIND TURBINE HAVING A MAIN POWER CONVERTER AND AN AUXILIARY POWER CONVERTER AND A METHOD FOR THE CONTROL THEREOF

BACKGROUND OF THE DISCLOSURE

A wind turbine having a main power converter and an auxiliary power converter is disclosed herein. Further, a control architecture for controlling the power balance of a wind turbine and a method for operating a wind turbine are disclosed herein.

BRIEF DESCRIPTION OF THE DISCLOSURE

A wind turbine which includes a main generator adapted to produce electrical power to be fed into a utility grid up to a rated generator output power and a main power converter connected to the main generator and adapted to convert the electrical output power of the main generator to an electrical power adapted to be fed into the utility grid up to a first rated converter output power is provided. According to a first embodiment, the wind turbine further includes an auxiliary power converter connected to the main generator and adapted to convert the electrical output power of the main generator to an electrical power up to a second rated converter output power which is lower than the first rated converter output power.

Further, a power generation plant for converting a variable renewable energy source is provided. The power plant includes, an internal supply grid for feeding electrical consumers of the power plant, a main generator adapted to produce electrical power to be fed into a utility grid up to a rated generator output power, and a main power converter connected to the main generator and adapted to convert the electrical output power of the main generator to an electrical power adapted to be fed into the utility grid. According to another embodiment, the wind turbine further includes an auxiliary power converter which is adapted to provide a power supply for the internal supply grid. The auxiliary power converter is connected to the main generator and further adapted to convert the electrical output power of the main generator up to a rated converter output power which is at least one order of magnitude lower than the rated generator output power.

Further, a wind turbine which includes a main controller, a main generator having a generator rotor, a first frequency converter connected to the main generator and a second frequency converter connected to the main generator is provided. The main generator is adapted to produce electrical power to be fed into a utility grid up to a rated generator output power. The first frequency converter is adapted to convert the electrical output power of the main generator to an ac electrical power at the frequency of the utility grid. Further, the first frequency converter includes a first controller which is adapted to control the power input from the main generator in accordance to power set points. The main controller is adapted to control the speed of the generator rotor by measuring the rotor speed and issuing power set points to the first controller. According to yet another embodiment, the second frequency converter is adapted to convert the electrical output power of the main generator to an ac electrical power at the frequency of the utility grid, and includes a second controller which is adapted to control the power input from the main generator independent of the main controller.

Furthermore, a control architecture for controlling the power balance of a wind turbine having a main generator with a generator rotor is provided. According to still another embodiment, the control architecture includes a first master controller which is adapted to change the torque balance of the generator rotor, and a second master controller which is adapted to change the torque balance of the generator rotor. The first master controller and the second master controller are further adapted to operate in a master to master mode.

Further, a method for operating a wind turbine having a main generator adapted to produce electrical power to be fed into a utility grid up to a rated generator output power is provided. The method for operating a wind turbine includes a step of providing a main power converter which is connected to the main generator and adapted to convert the electrical output power of the main generator to an electrical power adapted to be fed into the utility grid up to a first rated converter output power. The method for operating a wind turbine further includes a step of providing an auxiliary power converter which is connected to the main generator and adapted to convert the electrical output power of the main generator to an electrical power up to a second rated converter output power which is lower than the first rated converter output power. According to yet another embodiment, the method for operating a wind turbine further includes a step of activating the auxiliary power converter.

Further aspects, advantages and features are apparent from the dependent claims, the description and the accompanying drawings.

BRIEF DESCRIPTION OF THE DRAWINGS

A full and enabling disclosure of embodiments, including the best mode thereof, to one of ordinary skill in the art, is set forth more particularly in the remainder of the specification, including reference to the accompanying figures wherein.

For clarity reasons, the same elements or method steps have been designated by the same reference signs in the different drawings and diagrams if not stated otherwise.

DETAILED DESCRIPTION OF THE DISCLOSURE

Reference will now be made in detail to the various embodiments of the disclosure, one or more examples of which are illustrated in the figures. Each example is provided by way of explanation of the disclosure, and is not meant as a limitation. For example, features illustrated or described as part of one embodiment can be used on or in conjunction with other embodiments to yield yet a further embodiment. It is intended that such modifications and variations are included herewith.

Figure 1:
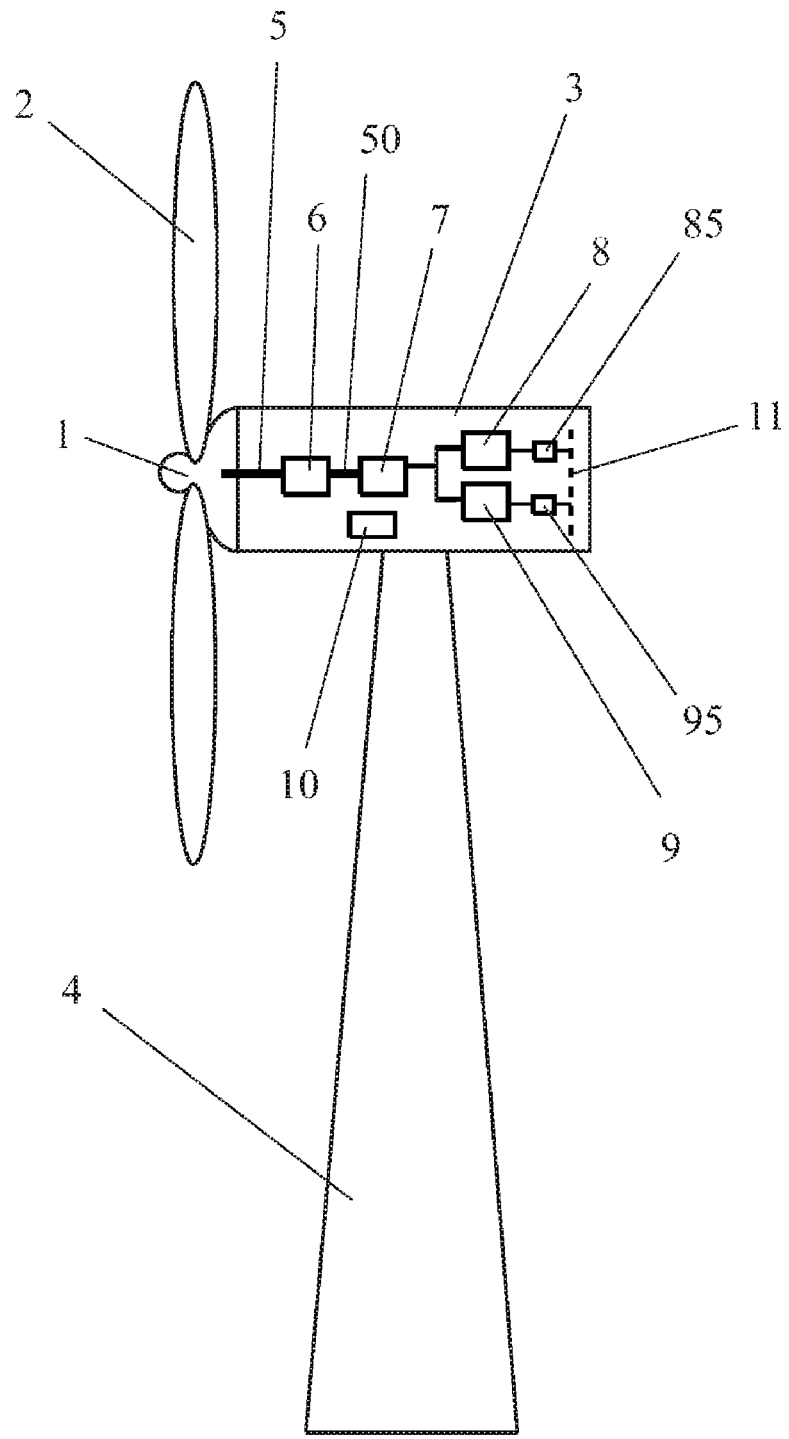
FIG. 1 shows a side view of a wind turbine according to several embodiments.

FIG. 1 shows a schematic side view of a typical horizontal-axis wind turbine 100. The wind turbine 100 includes a tower 4 to which a machine nacelle 3 is mounted at its top end. A hub or rotor 1 bearing one or more rotor blades 2 is mounted to a lateral end of the machine nacelle 3. The rotor blades 2 can be adjusted by pitch drives (not shown) which are typically accommodated inside the hub 1. In the context of this application, the term "wind turbine" refers to a machine that converts the kinetic energy of wind into mechanical energy. The mechanical energy is typically converted into electrical energy using an asynchronous main generator 7 or a synchronous main generator 7. The main generator 7 typically delivers electrical power which can be fed into a utility grid up to a rated generator output power. The rated output power of the main generator 7 is typically larger than 500 kVA and may be even larger than 1 MVA. In addition, the nacelle 3 typically houses a yaw motor (not shown), a turbine controller or main controller 10 and a drive train. The drive train of the wind turbine 100 typically includes all components to transmit the mechanical energy of the rotor 1 and to transform the mechanical energy of the rotor 1 into electrical energy including the rotor 1 and a main generator 7 having a generator rotor (not shown) which is mechanically connected to the rotor 10 during energy conversion. The drive train shown in FIG. 1 further includes a gearbox 6 for transforming the rotational speed of a driveshaft 5, which is typically coupled to the rotor 10, to a higher value of a high speed shaft 50.

The electrical outputs of the main generator 7 are connected to a main power converter 8 and an auxiliary power converter 9. In other words, the main power converter 8 and the auxiliary power converter 9 are connected in parallel to the outputs of the main generator 7. In the context of this application, the term "power converter" refers to an active device that converts an electric input power into a different electric output power and controls the power conversion. This includes frequency inverters for changing the frequency of an ac (alternating current) electric power, dc (direct current) converters for changing the voltage and/or the current, ac-to-dc converters and dc-to-ac converters. Typically, the power converter is a controllable device which performs the power conversion in dependence on external conditions and/or external requests. Power converters are usually rated in terms of the output power, i.e. the number of watts they can deliver. The main power converter 8 typically converts the electrical output power of the main generator 7 to an electrical power which can be fed directly or via a further transformer (not shown) into the utility grid up to a first rated converter output power. According to an embodiment, the auxiliary power converter 9 is arranged to convert the electrical output power of the main generator 7 to an electrical power up to a second rated converter output power which is lower than the first rated converter output power.

Typically, the second rated output power is at least one order of magnitude or even at least two orders of magnitude lower than the first rated output power. For example, the second rated output power may be lower than 100 kVA or lower than 50 kVA (kW kilowatts), whereas, depending on the rated generator output power, the first rated output power of the main converter 8 may be up to several MVA, e.g. 5 MVA. In other words, the auxiliary power converter 9 typically converts only a small fraction of the generators output power at high wind speed and during normal operation mode, in which the wind turbine 100 feeds electric power into the utility grid. In certain aspects, the rated power output of the auxiliary power converter 9 is on an order of magnitude of some kilowatts. This is typically sufficient to supply the essential components of the wind power turbine 100 such as, for example, the controllers, sensors, pitch and azimuth systems, hydraulic systems, heating systems, signaling devices, obstruction lights for ships and aircraft and the like.

The losses accompanying the power conversion typically amount up to a few percent of the rated converter output power. Therefore, the main power converter 8 is typically actively cooled using e.g. a liquid-to-air heat exchanger or an air-to-air heat exchanger to avoid overheating. The absolute losses of the auxiliary power converter 9 are typically lower. Therefore, the auxiliary power converter 9 typically includes only a passive cooling system such as cooling fins. Accordingly, the auxiliary power converter 9 has typically an overall higher converter efficiency than the main power converter 8 in the output power range up to the second rated converter output power. Using a passively cooled auxiliary power converter 9 in parallel to an actively cooled main power converter 8, which are designed such that the sum of the first rated converter output power and the second rated converter output power matches the rated generator output power, typically reduces the rated cooling power of the main power converters 8 cooling system. Further, the energy consumption of the main power converters 8 cooling system may be reduced this way. It is, however, also possible that the first rated converter output power matches the rated generator output power. This typically still allows more efficient power conversion of the wind turbine 100 in the power range up to the second rated power output and allows extending the operating range of the wind turbine 100. Further, the auxiliary power converter 9 can feed electrical power into the utility grid in the event of a defect main converter 8 or if the outside temperature is too high or too low for converting electric power with the main converter 8.

In some aspects, the output voltage of the main power converter 8 and the auxiliary power converter 9 are equal, e.g. 480V or 690 V. In this event, both power converters 8 and 9 can be directly connected e.g. via optional respective switches 85 and 95 to common power lines 11 as shown in FIG. 1.

According to another embodiment, the main generator 7 is of a self-excited or a permanently-excited generator as e.g. a permanent magnet generator. Alternatively, a generator with separate excitation can be used for which the excitation power is provided by an energy store, for example an accumulator. Permanent magnet technology offers several advantages. Due to the high power intensity, permanent magnet generators are usually of smaller size and weight than other generator types. Furthermore, they are usually made of fewer parts and allow brushless power generation resulting in high reliability. Since there are no excitation losses, permanent magnet generators are highly efficient. This is accompanied by only low heating of the generator.

The permanent-magnet generator typically delivers an ac electric power which has to be fed into an ac utility grid. According to still another embodiment, the main power converter 8 is a frequency converter for providing ac electrical power at the frequency of e.g. 50 Hz or 60 Hz of the utility grid and in phase with the utility grid. One major advantage of frequency converters is that they allow fast and easy synchronization with an external grid and/or other frequency converters.

Unless other generator concepts, such as the doubly-fed induction generator, a self-excited generator or permanently-excited generator does not need a utility grid to produce electrical power. Thus, an auxiliary frequency converter 9 which is connected to a self-excited generator 7 or permanently-excited generator 7 may provide an on-board power supply or at least an emergency power supply for the wind turbine 100 even during a utility grid outage. During an outage of the utility grid the auxiliary frequency converter 9 can typically be used to supply all electric consumers or at least some electrical consumers of the wind turbine 100 such as the controllers, sensors, pitch and azimuth systems, hydraulic systems, heating systems, and signaling devices. Thus, the wind turbine 100 need not to be shut-down completely during the outage of the utility grid and a complete restart of the wind turbine 100 after recovery of the utility grid can be avoided. Note, that it can take a long time (up to days under extreme cold weather conditions) to heat up the systems of the wind turbine again and to bring it back to service after recovery of the utility grid. Further, even during calm weather or low wind speed, the idling speed of the drive train and the corresponding remaining speed of the rotor of the permanent-magnet generator are typically still high enough to provide electrical power to supply at least some of the internal consumers of the wind turbine 100.

In a further aspect, the auxiliary frequency converter 9 at least supplies a controller for the azimuth angle of the nacelle 3, e.g. the main controller 10 and an azimuth drive for adjusting the azimuth angle of the nacelle 3. In this design, the auxiliary power converter 9 enables the orientation of the nacelle 3 and thus the rotor 1 in the wind during an outage of the utility grid. In doing so, the wind turbine 100 can actively follow changing wind directions so that the wind turbine 100 receives fewer loads, even in strong wind.

Furthermore, the concept of using a second or auxiliary power converter 9 as a power supply for the internal supply grid of the wind turbine 100 as described herein is also applicable to other power generation plants for converting a variable energy such as a wave power plant. In other words, the power generation plant for converting a variable renewable energy includes an internal supply grid 13 for feeding electrical consumers of the power plant, a main generator 7 for producing electrical power to be fed into a utility grid up to a rated generator output power and a main power converter 8 which is also connected to the main generator 7 and arranged to convert the electrical output power of the main generator 7 to an electrical power to be fed into the utility grid. The power generation plant further includes an auxiliary power converter 9 which is also connected to the main generators outputs. According to another embodiment, the auxiliary power converter 9 operates as a power supply for the internal supply grid 13. The auxiliary power converter 9 is further able to convert the electrical output power of the main generator 7 up to a rated converter output power which is at least one order of magnitude lower than the rated generator output power. Again, the power supply of the internal consumers of the power plant can be maintained in the event of an outage of the utility grid if a permanently-excited generator is used as main generator 7. Thus, the power plant can typically be brought back to service shortly after recovery of the utility grid. Further, service and maintenance work can be carried out easier during a grid outage. This is particularly useful for off-shore power generation plants which are preferably designed for a power outage lasting several days or weeks.

Figure 2:
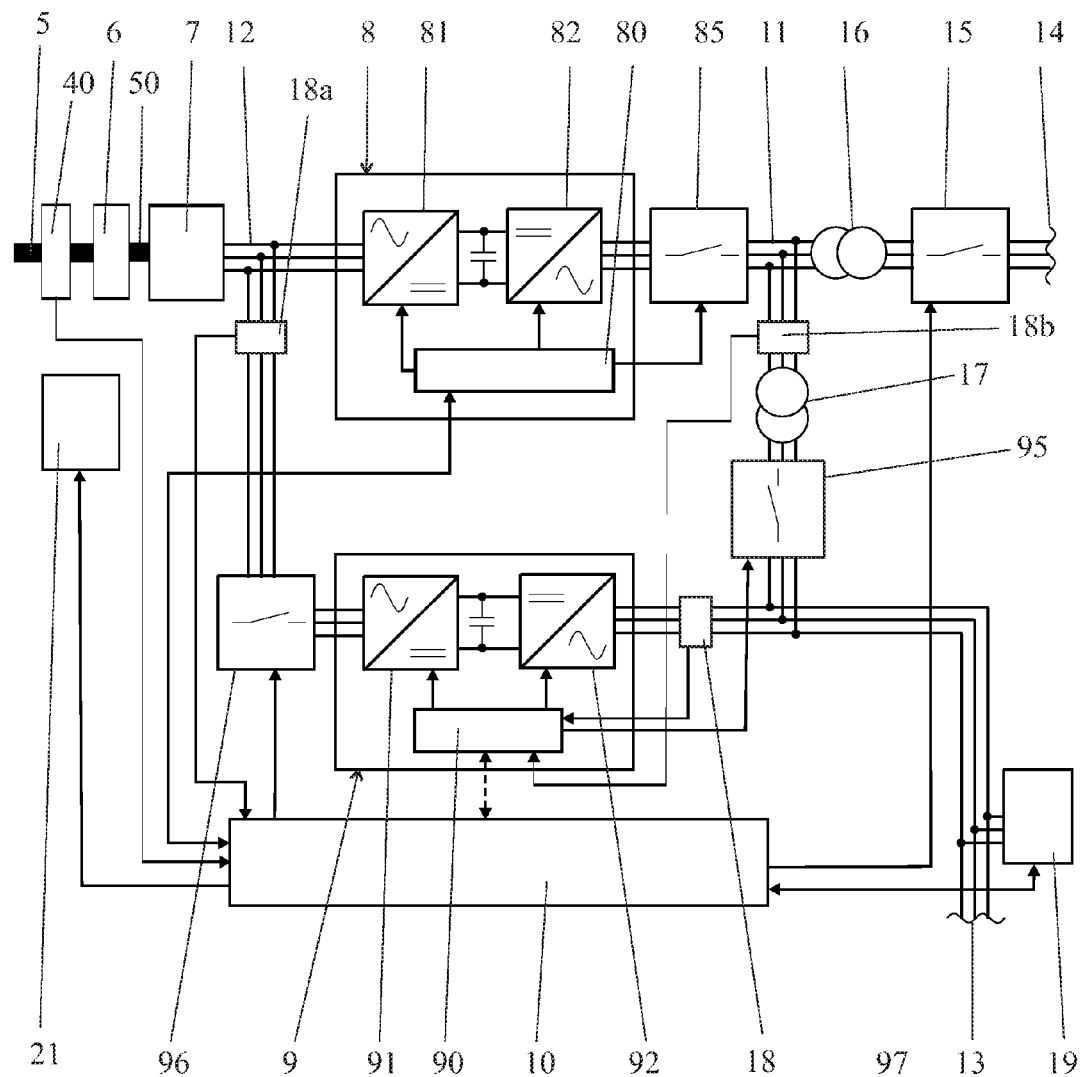
FIG. 2 shows a scheme of control architecture for controlling the power balance of a wind turbine according to further embodiments.

Further embodiments will be explained with reference to FIG. 2 illustrating a more detailed scheme of the control architecture (arrows correspond to flow of information) and the hardware of a wind turbine 100 as shown in FIG. 1.

A main frequency converter 8 and an auxiliary frequency converter 9 are connected in parallel via power lines 12 to a main generator 7, which converts the mechanical power of the drive train into a three-phase ac generator output power. Typically, the main generator 7 is a variable speed generator, such a permanent-magnet generator, which can deliver a variable frequency ac power up to a rated generator output power. The frequency of the generators 7 output power corresponds to the rotational speed of the generator rotor (not shown) which is mechanically coupled to the rotor of the wind turbine 100 via a high speed shaft 50, a gearbox 6 and a low speed shaft 5. During normal operation mode, the wind turbine 100 feeds electric power into a three phase ac utility grid 14. Accordingly, the main frequency converter 8 typically includes an ac-to-dc inverter 81 connected to an dc-to-ac inverter 82 to convert the variable frequency output power of the generator 7 into a fixed frequency ac power of e.g. 50 Hz or 60 Hz as required by the utility grid 14. Further, the main frequency converter 8 typically delivers electrical power in phase with the utility grid 14 and at a stable first converter output voltage which is suitable to be fed into the utility grid. A main transformer or line coupling transformer 16 is typically used to step up the output power of the main frequency converter 8 from e.g. 690 V to the medium voltage of the utility grid of e.g. several 10 kV.

The wind turbine 100 further includes an internal supply grid 13 for feeding the electric consumers of the wind turbine 100 such as motors, a heating and lubricating system, sensors and the control units such as the main controller 10. In addition, the auxiliary frequency converter 9 may operate in a grid-tie mode, in which the phases of the outputs of the auxiliary frequency converter 9 matches the phases of the utility grid 14 and/or the phases of the outputs of the main frequency converter 8. Accordingly, the shown auxiliary frequency converter 9 also includes an ac-to-dc inverter 91 connected to an dc-to-ac inverter 92 to convert the variable frequency output power of the generator 7 into a fixed frequency ac power of e.g. 50 Hz or 60 Hz as required by the utility grid 14. Operating in a grid-tie mode enables the auxiliary frequency converter 9 to feed electrical power into the utility grid 14 in parallel with the main frequency converter 8 (closed switches 15, 85, 95) or during a deactivation of the main frequency converter 8 (open switch 85 and closed switches 15 and 95). Such a deactivation may be caused by a too low wind speed, a defect of the main frequency converter 8 or due to too high or too low ambient temperature for operating the main frequency converter 8.

Further, the auxiliary frequency converter 9 typically delivers electrical power at a second converter output voltage to the internal supply grid 13. The second converter output voltage may e.g. be 230 V or 110 V and is typically lower than the first converter output voltage of e.g. 690 V. If the second converter output voltage is lower than the first converter output voltage the outputs of the two frequency inverters can only be connected via a transformer 17.

For clarity reasons, only a three phase ac internal supply grid 13 is shown in FIG. 2. The wind turbine 100 may, however, includes several internal supply grids in accordance with the requirements of different consumers. For example, sensors usually require a low voltage dc supply of e.g. 5 V or 12V. Some motors may require a dc-supply too. Typically, the output power of the auxiliary converter 9 is converted into an electric power for each of the supply grids using respective power converters connected to the outputs of the auxiliary converter 9. In some aspects, different auxiliary power converters are connected in parallel to the main power generator 7 to deliver the required power of the internal supply grids. For example, a first auxiliary power converter 9a delivers a 230 V ac power and a second auxiliary power converter 9b delivers a 12 V dc power. In another aspect, only one auxiliary power converter 9 feeds dc electrical power into the internal supply grid. The sum of the rated output powers of the auxiliary power converters and/or auxiliary frequency inverters is typically smaller than the rated output power of the main frequency inverter 7.

The rated converter current of the main power converter 8 may be at least one order of magnitude lower than the rated current of the auxiliary converter 9 shown in FIG. 2. As active devices the frequency converters 8 and 9 typically include active semiconductor devices or modules such as thyristors, IGBTs or dual IGBT modules with integrated freewheeling diode. In other words, the main frequency converter 8 and the auxiliary frequency converter 9 are typically solid state frequency converters. In some aspects, the main frequency converter 8 includes a first power semiconductor device and the auxiliary frequency converter 9 includes a second power semiconductor device which has a lower current switching capability compared to the first power semiconductor device.

In order to deliver the required electrical output power in accordance to external request and stably under variable wind conditions a control system is required. Usually, the main controller 10 can operate as a central control system which controls the wind power installation via special hardware components, such as for example a Single-Point-Status (SPS) controller and bus connections such as an Ethernet LAN, a Controller Area Network (CAN) bus or the like. The main controller 10 may include a programmable logic controller (PLC) or a computer operable to execute control algorithms. Typically, the main controller 10 operates as master controller which supervises at least a part of the functions of the wind turbine 100. This may include controlling of other controllers of the wind turbine 100, communication with other wind turbines and/or a wind farm management system as well as error handling and operational optimization. Further, a SCADA (Supervisory, Control and Data Acquisition) program may be executed on the main controller 10. For example, time critical tasks may be handled by other controllers which are operated as slave to the master controller 10. For example, blade regulation may be controlled by a controller of the hub which operates as slave to master controller. In the context of this application, the terms "master" and "slave" should be understood as referring to a communication protocol or communication model where the master device or master process has unidirectional control over one or more slave devices or slave processes. It should be further understood, that the term "control" also includes a regulation-type of control, e.g. a feedback-loop regulation. In the context of this application, the term "master controller" should be understood as referring to a controller which is not supervised from other controllers of the wind turbine 100. The term "master mode" should be understood as referring to an operation mode of a controller in which the controller acts as a master controller. Accordingly, the term "slave controller" should be understood a referring to a controller which controls a part of the wind turbine 100 but is supervised from another controller of the wind turbine 100. The term "slave mode" should be understood as referring to an operation mode of a controller in which the controller acts as slave controller. In other words, a master controller issues orders or commands to slave controllers but it does not act on orders or commands of other controllers of the wind turbine 100. A master controller may, however, receive and act on external orders or commands. For example, the main controller 10 of the wind turbine 100 may receive set points such as power to be produced from an external wind farm management system. Slave controllers act on orders or commands of a master controller. They may issue orders or commands to slave controllers which are on a lower hierarchy level of the command chain such as sub-controllers. In other words, a slave controller may operate as master of other slave controllers. But as long as a controller acts on commands or orders of other controllers, e.g. the master controller 10 of the wind turbine 100, it is considered to be a slave controller.

To control the power conversion of the wind turbine 100, the main frequency converter 8 and the auxiliary frequency converter 9 include suitably adapted controllers 80 and 90. The first controller 80 typically controls the power input of the main frequency inverter 8 from the main generator 7 in accordance to power set points received by the main controller or turbine controller 10. In other words, the first controller 80 typically operates as slave with respect to the main controller 10. In an emergency event, the first controller 80 may disconnect the power outputs of the main frequency inverter 7 using a main circuit breaker or power switch 85. Connecting and disconnecting of the main frequency inverter 8 is typically issued by the main controller 10 via the first controller 80 operating as slave-controller. The second controller 90 typically controls the power input from the main generator 7 independent of the main controller 10, i.e. it typically operates as independent master. The second controller 90 typically regulates the power flow to the internal supply grid 13 such that the auxiliary frequency converter 9 provides a power supply for the internal consumers of the wind turbine 100. For this purpose, the second controller 90 only needs information about the electric state of the internal grid 13. For example, in a stand-alone mode, in which the outputs of the auxiliary frequency converter 9 and the outputs of the main frequency converter 8 are not connected and the switch 95 is open, the second controller 90 increases power conversion which is accompanied by an increased power uptake of the auxiliary power converter 9 if a too low voltage or too rapidly decreasing voltage is measured on the internal supply grid 13 using e.g. a voltage sensor 18. Likewise, in the event of a too high voltage or to rapidly increasing voltage of the internal supply grid 13, the second controller 90 typically decreases the power conversion and the power uptake of the auxiliary power converter 9 from the main generator 7.

The main controller 10 typically controls the speed of the generator rotor e.g. by measuring the rotor speed using a tachometer 40 and issuing power set points to the first controller 80. The torque applied to the generator rotor by the uptake of electrical power of the main power converter 8 is given by the product of electrical power and the angular speed of the generator rotor. Thus, the main controller 10 is arranged to change the torque balance of the generator rotor. This applies also to the second controller 90 which typically regulates the power uptake autonomously. The total torque balance of the generator rotor is determined by the torque exerted by the wind via the rotor 1 and sum of the torques exerted by the main power converter 8 and the auxiliary power converter 9. In other words, the main controller 10 and the second controller 90 are arranged to change the torque balance of the generator rotor. A non-zero total torque balance, i.e. an imbalance of the torques applied to the generator rotor, will result in a change of the generator rotor speed. This is typically detected by measuring the speed of the rotor 1 and/or the speed of the generator rotor.

Typically, the main controller 10 can also balance the power production and the power consumption of the wind turbine 100 by issuing a change of the pitch angles of the rotor blades using the pitch drives 21. For example, the second controller 90 autonomously controls the auxiliary converter 9 also during an outage of the utility grid 13 such that the auxiliary converter 9 provides a power supply for the internal supply grid 13. In the event of a utility grid outage, the main controller 10 typically deactivates the main power converter 8 and controls the pitch drives of the rotor blades 2 such that the rotor speed remains on average constant. Accordingly, the power production of the auxiliary power converter 9 matches at least on average the power consumption of the wind turbine 100. Any power fluctuations may be compensated by an energy storage device such as a capacitor or the uninterruptible power supply (UPS) 19.

In other words, the control architecture for controlling the power balance of a wind turbine 100 having an internal supply grid 13 includes a first and a second independent master controller which can operate in a master-to-master mode. The first master controller 10 and the second master controller 90 are adapted to change the torque balance of the generator rotor.

During normal operation, the main power converter 8 and the independently controlled auxiliary power converter 9 may feed in parallel electric power into the utility grid 14. In certain aspects, the main controller 10 also issues power commands to the first controller 90, if the rotor speed changes to rapidly or if the rotor speeds exceeds or falls below certain thresholds to compensate the torque imbalance. In doing so, the rotor speed can e.g. be clamped close to an optimal rotor speed at given wind speed which is typically measured in addition.

Further, the main controller 10 can typically determine the power balance of the wind turbine 100 if the main controller 10 further obtains information of the power flow through the auxiliary frequency converter 9 from an optional power meter 18a and/or the second controller 90. The regulation of the voltage of the internal supply grid 13, i.e. maintaining a constant voltage level is, however, typically carried out automatically and autonomously by the auxiliary controller 90.

As has been explained above, the auxiliary frequency converter 9 can operate in a grid-tie mode and in a stand-alone mode. In the stand-alone mode, the auxiliary frequency converter 9 typically provides a power supply of the internal supply grid 14. In the grid-tie mode, the auxiliary frequency converter 9 matches at least one phase with a sine wave supplied by the utility grid 14 or the main frequency inverter 8 and typically maximizes the power output. Any excess power that is not consumed by the consumers of the wind turbine 100, including an uninterruptible power supply 19 that may have to be recharged, is fed into the utility grid, in this mode. For temporarily supplying the internal supply grid 13 a commercial UPS based on accumulators is usually provided.

The auxiliary frequency converter 9 of the wind turbine 100 of FIG. 2 is switchably connected to the outputs of the main generator 7. It should, however, be noted that the switch 96 is only optional and a switch for disconnecting the auxiliary power converter 9 may also be integrated into the auxiliary frequency converter 9. This is further explained with respect to FIG. 3.

Figure 3:
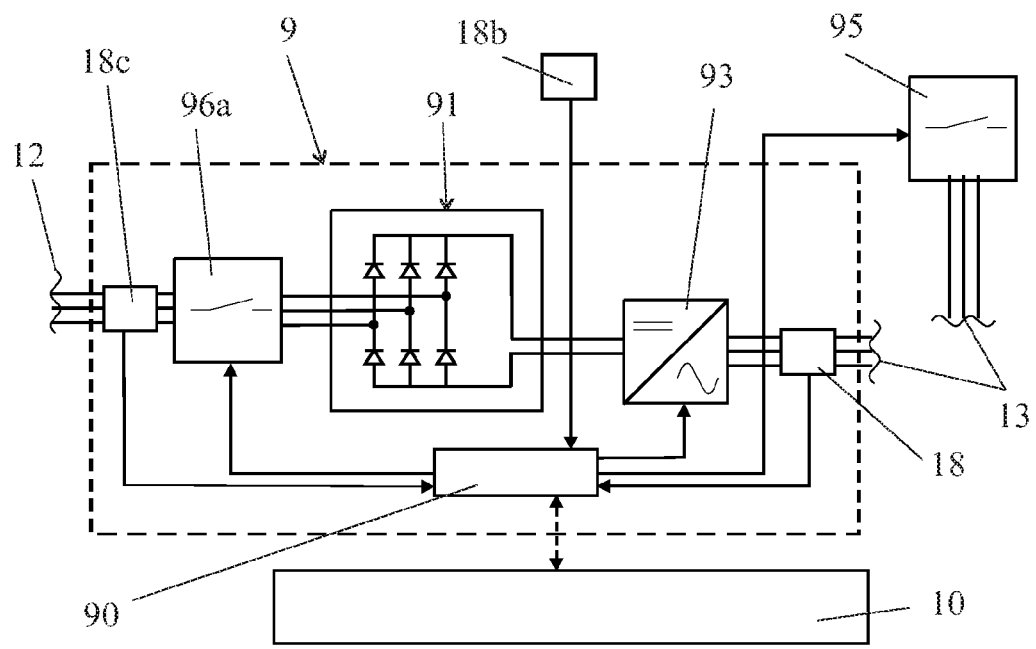
FIG. 3 shows a scheme of an auxiliary frequency converter according to certain embodiments.

FIG. 3 shows a scheme of an auxiliary frequency converter 9 according to certain embodiments. The auxiliary frequency converter 9 includes an exemplary ac-to-dc inverter 91 to convert a three phase ac input power received from the main generator 7 via the power lines 12 to a dc-power. For sake of simplicity, additional electronic devices to smooth and/or store part of the dc-power such as capacitors are not drawn. For power conversion, the dc-power is fed into a dc-to-ac inverter 93.

In one example, a photovoltaic inverter or solar inverter is used as dc-to-ac inverter 93. One type of photovoltaic inverters is typically used to change direct current (dc) from a solar cell array to alternating current (ac), to synchronize with an external grid and feed the energy into the external grid, i.e. these photovoltaic inverters are arranged to operate in a grid-tie mode. Other types of photovoltaic inverters are adapted to build their own grid and keep it running, i.e. keep phase and frequency stable. This means, that these converter types operate in a stand-alone mode. The main difference between the two photovoltaic converter types refers to the control software running on a controller of the photovoltaic inverter such as a DSP controller. In other words, a commercially available photovoltaic inverter such as the PV-PNS 04 ATL-GER of Mitsubishi Electric (e.g. available from Mitsubishi Electric Europe B.V., Photovoltaic Division, Gothaer Str. 8, D-40880 Ratingen, Germany) may be arranged to operate both in the stand-alone mode and in the grid-tie mode mainly by adaptation of the control software. Further, photovoltaic inverters typically convert dc electric power in an input voltage range of about 50 V to about 750 V and are hence well suited to convert a rectified power output of a typical wind turbine generator, such as a permanent-magnet generator. Furthermore, the digital signal controller of a photovoltaic inverter is typically already designed to effectively execute very precise algorithms required to charge an additional battery or the UPS 19. Thus, the DSP controller or a controller of another type of a commercially available photovoltaic inverter may be used after some modifications as second controller 90 of the auxiliary frequency inverter 9. For example, the controller software may be modified to support switching of the optional switches 95 and 96a for disconnecting the auxiliary frequency inverter 90 from the internal supply grid 13 the main generator outputs, respectively.

As can be further appreciated from FIG. 3, the second controller typically detects the electric state of the internal supply grid 13 and of the power output of the main generator 7 using sensors 18 and 18c, respectively. According to another embodiment, the second controller 90 switches autonomously between the grid-tie mode and the stand-alone mode. Typically, the second controller 90 autonomously switches the auxiliary frequency converter 9 into the stand-alone mode upon detecting an output voltage of the main generator 7 which is above a voltage threshold of e.g. 50 V to allow power conversion and detecting the absence of a grid on the outputs of the main converter 90 using the sensor 18b. In the event of a control architecture as shown in FIG. 2, but without the optional switch 95 or closed switch 95, the sensor 18b may also be omitted and the signal of the sensor 18 may be used to trigger the switching of the auxiliary frequency converter 9 into the stand-alone mode. Detecting no grid with the sensor 18b typically corresponds to situation in which now power is fed into the utility grid 14, e.g. due to an outage of the utility grid or due to a failure of the main frequency converter 8. Alternatively and/or in addition the second controller 90 may directly detect the electric state of the utility grid 14 using an additional sensor.

While the main frequency converter 8 does not convert electrical power, the auxiliary frequency converter 9 typically ensures at least the supply of the main controller 10 of the wind turbine 100 and the supply of at least one pitch drive so that at least one of the rotor blades 2 can be set to a position other than the flag position. Typically, the rotor blade pitch angles are adjusted such that the rotational speed of the generator rotor is within a range, for example 400-500 revolutions per minute, which is favorable for provision of electric power by the auxiliary frequency converter 9.

If the detected voltage of the main generators 7 outputs falls below the voltage threshold of e.g. 50 V, e.g. during calm weather, and/or if the power request of the internal supply grid 13 exceeds the second rated power output for a certain time, the controller 90 typically stops power conversion of the auxiliary frequency converter 9.

In some aspects, the recovery of the utility grid 14 is detected by an additional sensor permanently measuring the electric state of the utility grid 14. This signal is typically transferred to the main controller 10 and the second controller 90. In this event, the second controller 90 typically switches the auxiliary frequency inverter 9 into the grid-tie mode.

Further methods for operating a wind turbine will be explained with reference to the following figures.

Figure 4:
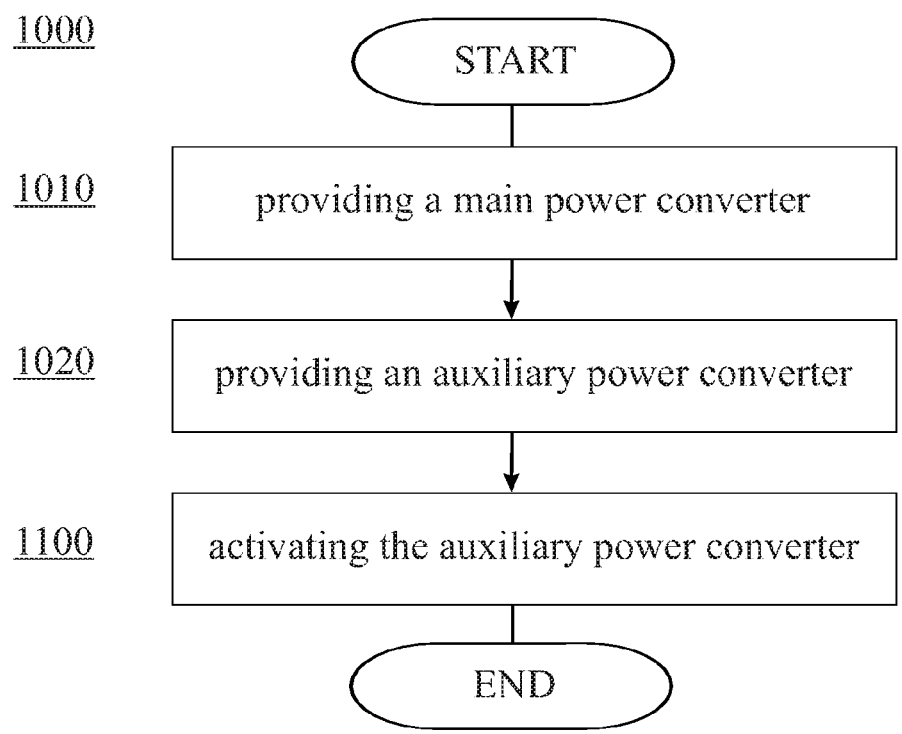
FIG. 4 shows a flow diagram of a method for operating a wind turbine according to several embodiments.

FIG. 4 shows a flow diagram of a method for operating a wind turbine 100. According to an embodiment, the method 1000 for operating the wind turbine 100 having a main generator 7, such as e.g. a permanent-magnet generator, of a rated generator output power includes three steps. In the first two steps 1010 and 1020 a main power converter 8 connected to the main generator 7 and an auxiliary power converter 9 connected to the main generator 7 are provided. The main power converter 8 and the auxiliary power converter 9 are arranged to convert the electrical output power up to a first rated converter output power and a second rated converter output power which is slower than the first rated converter output power, respectively. The two steps 1010 and 1020 are typically already performed during assembly of the wind turbine 100 such that the main power converter 8 and the auxiliary power converter 9 are connected in parallel. Further, the order of the steps 1010 and 120 may also be reversed. In the subsequent step 1100 the auxiliary power 9 converter is activated. In the activated state the auxiliary power 9 converts electrical power. The process of activating the auxiliary power 9 typically includes preparative steps such as detecting the state of other grids prior to starting the power conversion. This will be explained in more detail by way of example mainly with respect to frequency converters as first and second power converters 8 and 9 in the following.

Figure 5:
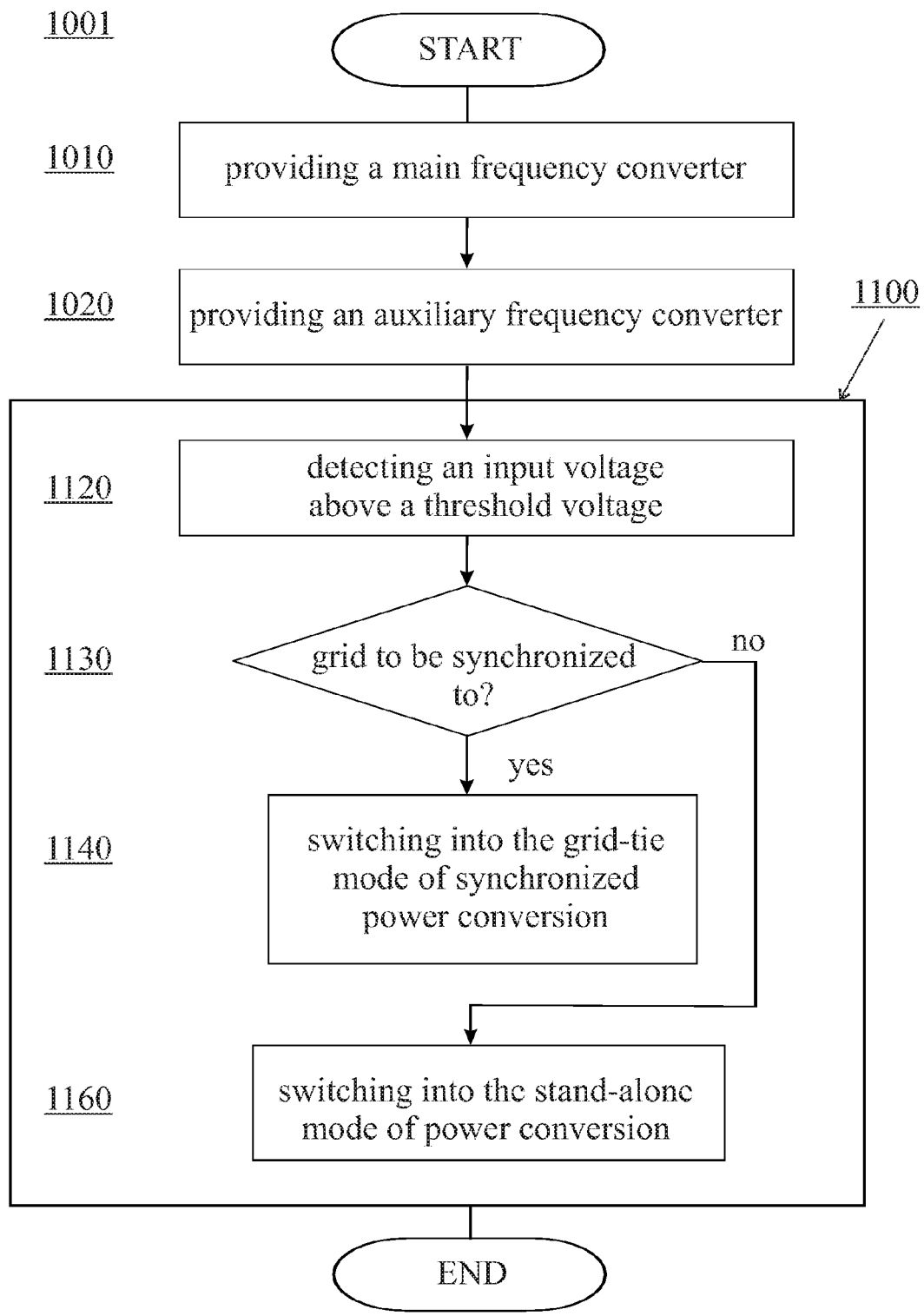
FIG. 5 shows a flow diagram of a method for operating a wind turbine according to several embodiments.

FIG. 5 shows a flow diagram of a method 1001 for operating a wind turbine 100 according to several embodiments. Subsequent to the step 1010 of providing a main frequency converter 8 and the step 1020 of providing an auxiliary frequency converter 9 as explained with respect to FIG. 4, several steps are typically carried out by the second controller 90 to activate the auxiliary frequency converter 9. The auxiliary frequency converter 9 typically monitors the output voltage of the main generator 7, which is the input voltage of the auxiliary frequency converter 9, and the electric state of the utility grid 14 and/or the supply grid 13. If in a step 1120 an input voltage above a threshold of e.g. 50 V is detected, the second controller 90 decides in step 1130 into which mode auxiliary frequency converter 9 has to be set. This decision typically relies only on the electric state of the utility grid 14 and/or the supply grid 13. In other words, the second controller 90 operates as independent master. If no grid is detected, the auxiliary frequency converter 9 starts power conversion in the stand-alone mode in step 1160. Otherwise, the second controller 90 switches the auxiliary frequency converter 9 into the grid-tie mode. The step 1140 of switching the auxiliary frequency converter 9 into the grid-tie mode, includes synchronizing the auxiliary frequency converter 9 to the outputs of the main frequency converter 8 or, if e.g. the main frequency converter 8 is not operating, directly to the utility grid 14. Further, the step 1100 of activating the auxiliary power converter 9 may include a further step of connecting the outputs of the auxiliary frequency converter 9 to the line coupling transformer 16 and/or to the internal grid 14, and a further step of closing the connection between the power outputs of the main generator 7 and the power inputs the auxiliary frequency converter 9 if the wind turbine 100 includes respective switches 95, 96 and 97 as shown in FIG. 1.

The method 1001 may already be carried out during start-up of the wind turbine 100 from standstill or during erection of the wind turbine 100, even in the absence of the utility grid 14. In this event, the second controller 90 initially fed by the UPS 19 of the wind turbine 100 or an internal battery switches the auxiliary frequency converter 9 into the stand-alone mode, if the idling rotor 1 of the wind turbine delivers enough torque to rotate the generator rotor fast enough for delivering an output voltage above a certain threshold. In this mode, the auxiliary frequency converter 9 provides a power supply of the internal supply grid 13 and starts the recharging of the UPS if required. Typically, the main controller 10 boots after the internal supply grid 13 is established. After booting, the main controller 10 typically regulates as independent master the rotor speed using the pitch drives and the yaw drive such that the power consumption and production of the wind turbine 100 is matched. Typically, the main controller 10 only issues changes of rotor blade pitch angles and azimuth angle of the nacelle, if the rotor speed is already above a certain threshold, i.e. if the generator 7 is able to produce enough electrical power. Initially, the main controller 10 may only issue the change of one pitch angle to increase the rotor speed. After recovery of the utility grid 14, the second controller 90 typically switches the auxiliary frequency converter 9 into the grid-tie mode of synchronized power conversion and the main frequency converter 8 is activated by the main controller 10.

Figure 6:
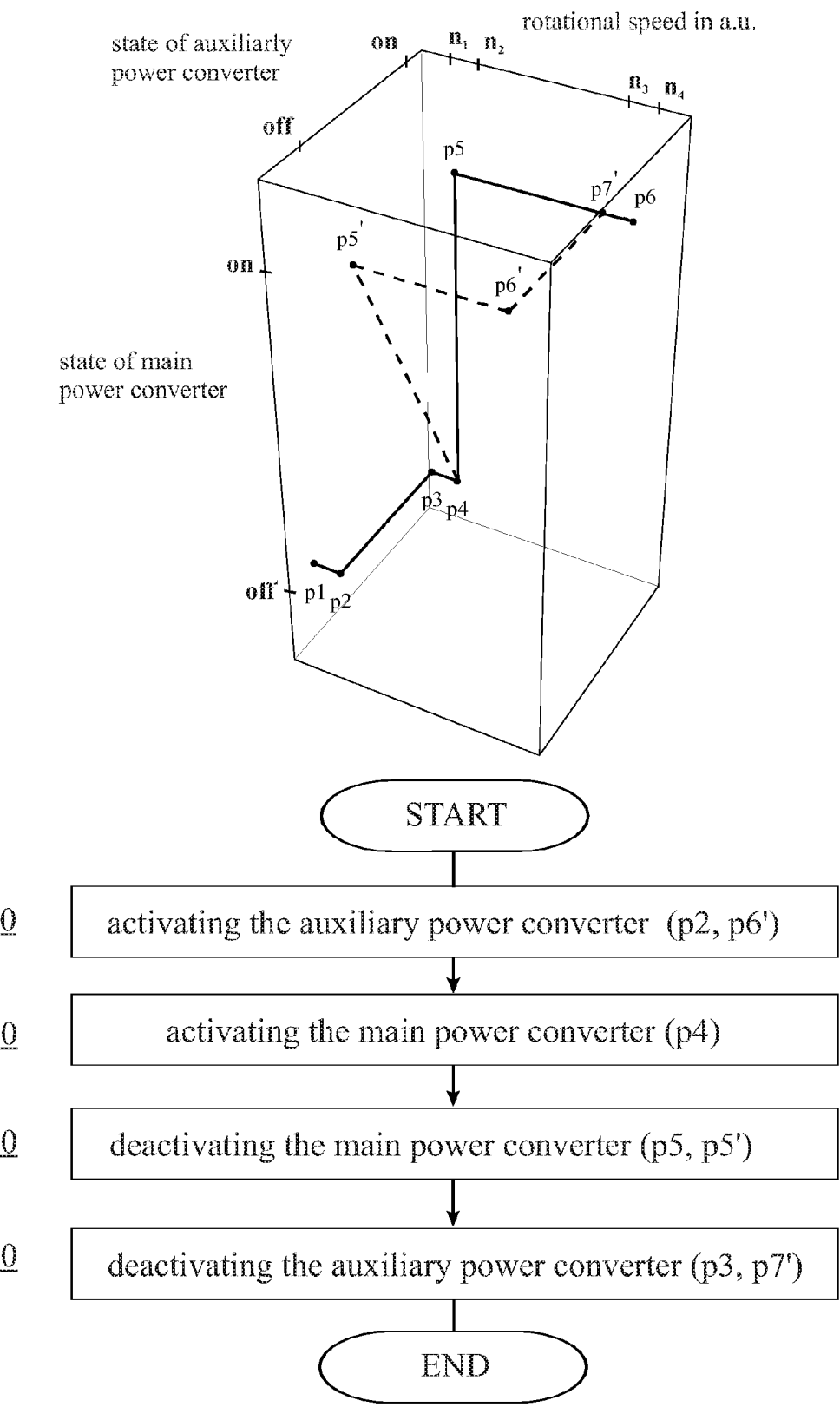
FIG. 6 illustrates different methods for operating a wind turbine according to further embodiments.

FIG. 6 illustrates different methods for operating a wind turbine 100 according to further embodiments. In the upper part of FIG. 6, typical states of the main power converter 8 and the auxiliary power converter 9 are plotted as function of the absolute rotational speed of the rotor 1 and the main generators 7 rotor, respectively. The on-state corresponds to the activated state, in which the respective power converter converts electrical power. Likewise, the off-state corresponds to the deactivated state, in which the respective power converter does not convert electrical power. Typically, at least the main power converter 8 is a frequency converter. If the rotational speed exceeds or falls below one of the thresholds n1 to n3, the power converters 8 and 9 are typically activated or deactivated in corresponding steps 1100, 1200, 1300 and 1400 as indicated in the lower part of FIG. 6. A change of wind speed typically results in changing rotational speed of the rotor 1 and the main generators 7 rotor, respectively. Thus, the operating states of the power converters 8 and 9 of the wind turbine 100 typically follow a path along the full curve from point p1 to p6 or along the dashed curve from point p1 over p4, p5' and p7' to p6. For example, prior to start-up of the wind turbine 100 both converters are deactivated. After releasing the break of the wind turbine 100, the rotor 1 starts rotating from zero velocity at point p1. Above a first threshold of the rotor speed n1 reached at point p2, the second controller 90 of the auxiliary power converter 9 detects a voltage above a certain threshold which allows power conversion and activates the auxiliary power converter 9. The wind turbine 100 operates now at point p3. Typically, the first threshold of the rotor speed n1 is already reached at low wind speed an idling rotor 1. Further, the main controller typically starts to speed up the rotor 1 e.g. by changing the pitch angle of the rotor blades 2. Above a second threshold of the rotor speed n2 reached at point p4, the main controller 10 activates the main power converter 8 and disconnects the auxiliary power converter 9 by opening the switch 96 shown in FIG. 1. In this event, the second controller 90 deactivates the auxiliary power converter 9 after detecting a too low, i.e. zero, input voltage. The wind turbine 100 operates now at point p5' in which only the main power converter 8 converts power. Typically, the internal supply grid 13 is also fed by the main power converter 8 between the point p5' and p7'. Above a third threshold of the rotor speed n3 reached at point p6', the main controller 10 closes again the switch 96 and the second controller 90 activates the auxiliary power converter 9 again resulting in an operating state of point p7'. The maximum power the wind turbine 100 can feed into the utility grid 14 is reached at a fourth threshold of the rotor speed n4 at point p6. The fourth threshold of the rotor speed n4 typically corresponds to a power production of the main generator 7 at the rated generator output power. Therefore, the main controller 10 regulates the rotor speed typically such, that the fourth threshold n4 is at most only exceeded for a short time to avoid overloading. If the rotor speed decreases, e.g. due to a decreasing wind speed that can not be compensated by pitching the rotor blades 2, the auxiliary power converter 9 is deactivated at point p7'. An even further decreasing rotor speed may result in activating the auxiliary power converter 9 and deactivating the main power converter 9 at point p5' and finally in deactivating the auxiliary power converter 9 at point p3. In another example which follows a path along the full curve from point p1 to p6, the auxiliary power converter 9 is not deactivated and/or activated above the first threshold n1. This simplifies the operating control of the wind turbine 100. Further, this example goes without the additional power switch 95 shown in FIG. 1. Both examples have in common, that the wind turbine 100 is typically also able to deliver electric power to the utility grid 14 at a wind speed corresponding to the rotor speed n2 below which power conversion with the main power converter 8 is not efficient e.g. due to the losses of the cooling system. Thus, the operating range of the wind turbine 100 can be extended.

Figure 7:
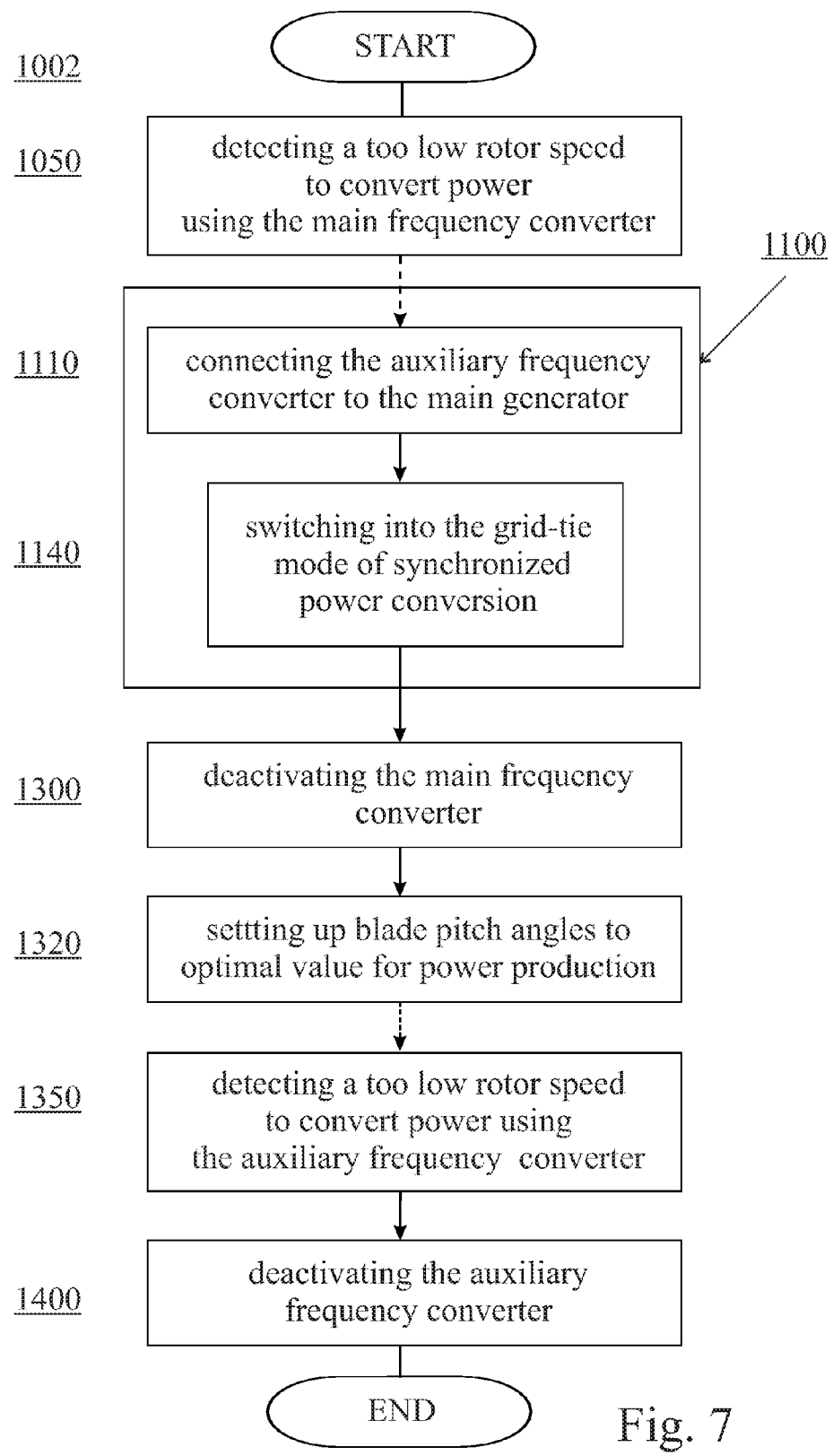
FIG. 7 shows a flow diagram of a method for operating a wind turbine according to yet further embodiments.

With respect to FIG. 7 showing a flow diagram of a further method for operating a wind turbine 100 according to several embodiments will be explained. The method 1002 is typically carried during low or lowering wind speed and may corresponds to a path from point p5' to p1 or a path from point p5 to p1 of FIG. 6 with operating utility grid 14. After detecting a too low rotor speed in step 1050, the auxiliary frequency converter 9 is activated in step 1100, if the wind turbine 100 starts from a state corresponding to a point on the dashed curve of FIG. 6. The step 1100 includes a step 1110 of connecting the auxiliary frequency converter 9 to the outputs of the main generator 7 and a step 1140 of switching the auxiliary frequency converter 9 into the grid-tie mode. Typically, the step 1100 is autonomously performed by the second controller 90 after detecting a high enough input voltage provided by the main generator 7. If the wind turbine 100 starts from a state corresponding to a point on the full curve of FIG. 6, the step 1100 is omitted. Subsequently, the main frequency converter 8 is deactivated in step 1300. In step 1320, the main controller 10 starts regulating the speed of the rotor 1 by issuing the blade pitch angles such that the power production of the wind turbine 100 is at maximum. This typically allows feeding of electrical power into the utility grid 14.

When calm weather of extremely low wind speed sets in, the rotor speed becomes eventually very low. If a too low rotor speed for power conversion of the auxiliary frequency converter 9 is detected in a step 1350, the auxiliary frequency converter 9 is deactivated in a step 1400. For safety reasons, signaling devices and obstruction lights are further supplied by the uninterruptible power supply 19 of the wind turbine 100. Typically, the too low rotor speed corresponding to a too low rotational speed of the generator rotor for power conversion is independently detected by the second controller 90, e.g. by measuring the output voltage and/or the frequency of the main generator 7.

Figure 8:
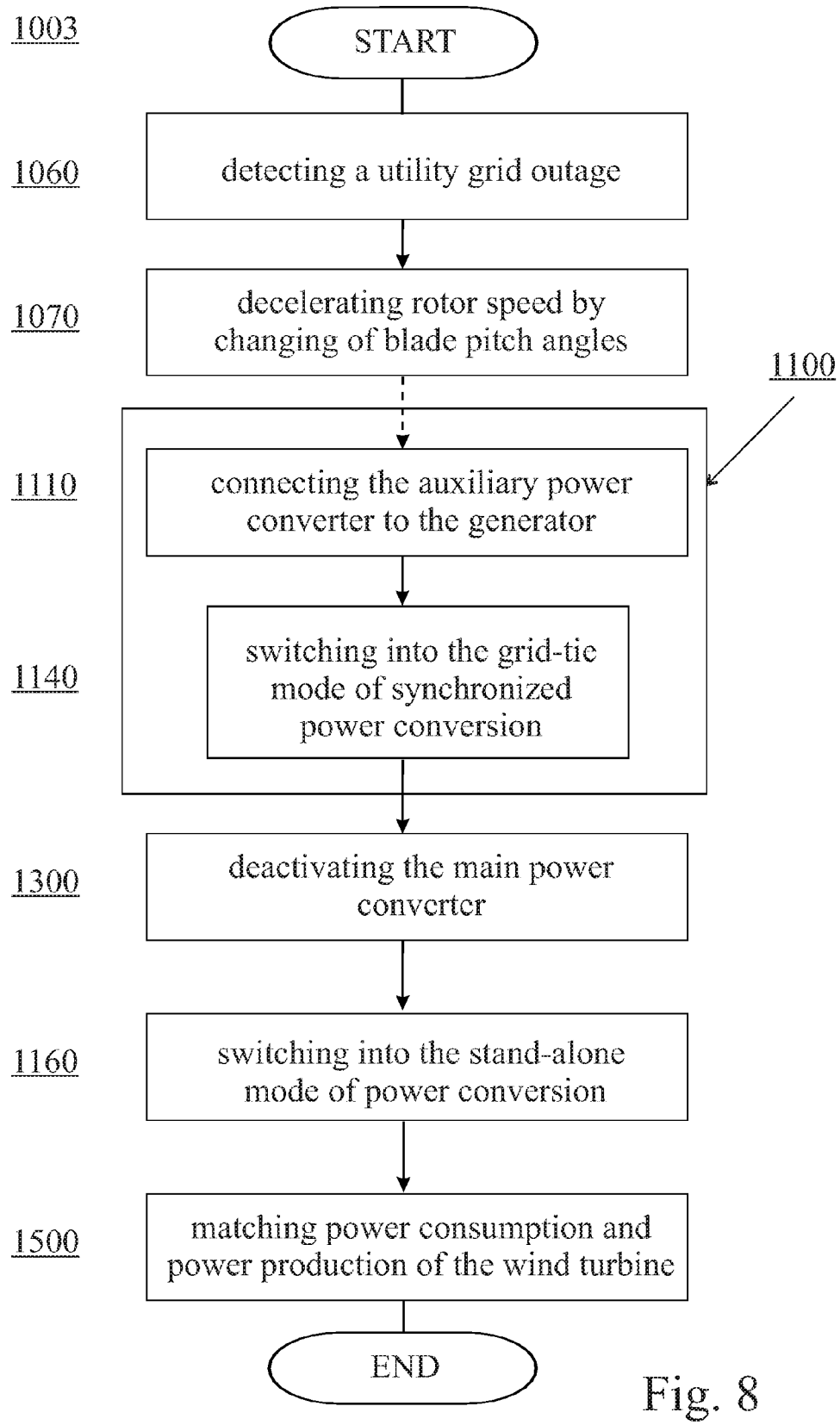
FIG. 8 shows a flow diagram of a method for operating a wind turbine according to still further embodiments.

With respect to FIG. 8 showing a flow diagram still a further method for operating a wind turbine 100 according to further embodiments will be explained. The method 1002 is typically carried out during an outage of the utility grid 14 and may correspond to a path from point p5' to p1 or a path from point p5 to p1 of FIG. 6 without operating utility grid 14. After detecting an outage of the utility grid 14 in a step 1060, the rotor 1 of the wind turbine 100 is decelerated e.g. by changing the blade pitch angles in a step 1070. Subsequently, the auxiliary frequency converter 9 is activated in step 1100, if the wind turbine 100 starts from a state corresponding to a point on the dashed curve of FIG. 6. The step 1100 typically includes a step 1110 of connecting the auxiliary frequency converter 9 to the outputs of the main generator 7 and a step 1140 of switching the auxiliary frequency converter 9 into the grid-tie mode, in which the auxiliary frequency converter 9 is synchronized with the main frequency converter 8.

Typically, the step 1100 is autonomously performed by the second controller 90 after detecting a high enough input voltage provided by the main generator 7. If the wind turbine 100 starts from a state corresponding to a point on the full curve of FIG. 6, the step 1100 is omitted. Subsequently, the main frequency converter 8 is deactivated in step 1300. Since the second controller 90 can no longer detect another grid, it switches the auxiliary frequency converter 9 into the stand-alone mode in step 1160 to provide a power supply for the internal supply grid 13. Finally, the power production and power consumption of the wind turbine 100 is matched in a step 1500. This is typically achieved by independent operating of the main controller 10 and the second controller 90. The main controller 10 typically measures the rotor speed (or the speed of the generator rotor) and regulates the rotor speed to a constant value by issuing commands for changing the pitch angle of at least one rotor blade 2. This ensures the balance between the power consumption and the power production of the wind turbine 100.

This written description uses examples to disclose embodiments, including the best mode, and also to enable any person skilled in the art to make and use such embodiments. While various specific embodiments have been described, those skilled in the art will recognize other embodiments can be practiced with modification within the spirit and scope of the claims. Especially, mutually non-exclusive features of the embodiments described above may be combined with each other. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A wind turbine comprising:
a main generator configured to produce electrical output power to be fed into a utility grid up to a rated generator output power;
a main power converter connected to the main generator and configured to convert the electrical output power of the main generator to an electrical power to be fed into the utility grid up to a first rated converter output power;
an auxiliary power converter electrically connected to the main generator and configured to convert the electrical output power of the main generator to an electrical power up to a second rated converter output power which is lower than the first rated converter output power; and an internal supply grid,
wherein the auxiliary power converter comprises an auxiliary frequency converter which comprises a controller configured to operate the auxiliary frequency converter in a grid-tie mode and in a stand-alone mode; wherein, in the grid-tie mode, the auxiliary frequency converter matches at least one phase with a sine wave supplied by the utility grid or the main power converter and maximizes power output; and wherein, in the stand-alone mode, the auxiliary frequency converter provides a power supply of the internal supply grid.

2. The wind turbine according to claim 1, wherein the main power converter is a frequency converter which is configured to provide ac electrical power at a frequency of the utility grid.

3. The wind turbine according to claim 1, wherein the auxiliary frequency converter is further configured to feed ac electrical power at a frequency of the utility grid into the internal supply grid.

4. The wind turbine according to claim 1, wherein the auxiliary power converter is further configured to feed dc electrical power into the internal supply grid.

5. The wind turbine according to claim 1, wherein the second rated converter output power is at least one order of magnitude lower than the first rated converter output power.

6. The wind turbine according to claim 1, wherein the first rated converter output power matches the rated generator output power.

7. The wind turbine according to claim 1, wherein the sum of the first rated converter output power and the second rated converter output power matches the rated generator output power.

8. The wind turbine according to claim 1, wherein the main power converter is configured to deliver electrical power up to a first rated converter current; wherein the auxiliary power converter is configured to deliver electrical power up to a second rated converter current; and wherein the second rated converter current is at least one order of magnitude lower than the first rated converter current.

9. The wind turbine according to claim 1, wherein the wind turbine further comprises a rotor with at least one rotor blade, a tachometer for measuring a rotor speed and a main controller; wherein the main power converter comprises a first controller configured to control the electrical output power from the main generator in accordance to power set points; and wherein the main controller is configured to control the rotor speed by measuring the rotor speed and issuing power set points to the first controller.

10. The wind turbine according to claim 9, further comprising a pitch drive for each of a plurality of rotor blades, wherein the main controller is further configured to control the pitch drives of the rotor blades such that the power production of the auxiliary power converter matches the power consumption of the wind turbine during an outage of the utility grid.

11. The wind turbine according to claim 1, wherein the controller is further configured to autonomously switch between the grid-tie mode and the stand-alone mode upon detecting an output voltage of the main generator which is above a voltage threshold and detecting a state of the wind turbine in which no power is fed into the utility grid.

12. The wind turbine according to claim 1, wherein the auxiliary power converter is switchably connected to the main generator.

13. The wind turbine according to claim 1, wherein the main generator is a permanently-excited generator.

14. A method for operating a wind turbine comprising a main generator configured to produce electrical output power to be fed into a utility grid up to a rated generator output power, and an internal supply grid, the method comprising:
using a main power converter connected to the main generator to convert the electrical output power of the main generator to an electrical power to be fed into the utility grid up to a first rated converter output power, wherein the main power converter is a frequency converter configured to provide ac electrical power at a frequency of the utility grid;
using an auxiliary power converter electrically connected to the main generator to convert the electrical output power of the main generator to an electrical power up to a second rated converter output power, the second rated converter output power being lower than the first rated converter output power, wherein the auxiliary power converter is an auxiliary frequency converter configured to provide ac electrical power at the frequency of the utility grid for providing a power supply to the internal grid; and
activating the auxiliary power converter,
wherein activating the auxiliary power converter comprises at least one of:
detecting an output voltage of the main generator which is higher than a threshold voltage; and
detecting a state of the utility grid.

15. The method according to claim 14, further comprising switching the auxiliary frequency converter into a grid-tie mode, wherein switching the auxiliary frequency converter into the grid-tie mode comprises at least one of:
synchronizing the auxiliary frequency converter to the external grid; and
synchronizing the auxiliary frequency converter and the main frequency converter.

16. A method for operating a wind turbine comprising a main generator configured to produce electrical output power to be fed into a utility grid up to a rated generator output power, the method comprising:
using a main power converter connected to the main generator to convert the electrical output power of the main generator to an electrical power to be fed into the utility grid up to a first rated converter output power;
using an auxiliary power converter electrically connected to the main generator to convert the electrical output power of the main generator to an electrical power up to a second rated converter output power, the second rated converter output power being lower than the first rated converter output power; and
activating the auxiliary power converter,
wherein the main generator further comprises a generator rotor, the method further comprising at least one of:
deactivating the auxiliary power converter;
activating the main power converter;
deactivating the main power converter;
measuring a generator rotor speed; and
matching a power consumption and a power production of the wind turbine.

* * * * *